Jan. 10, 1961  R. W. JONES ET AL  2,967,378
METHOD AND APPARATUS FOR BENDING GLASS
Filed Dec. 9, 1958  2 Sheets-Sheet 1
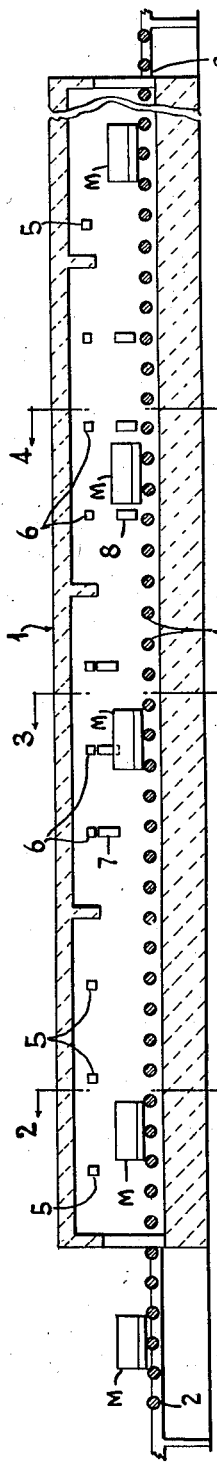
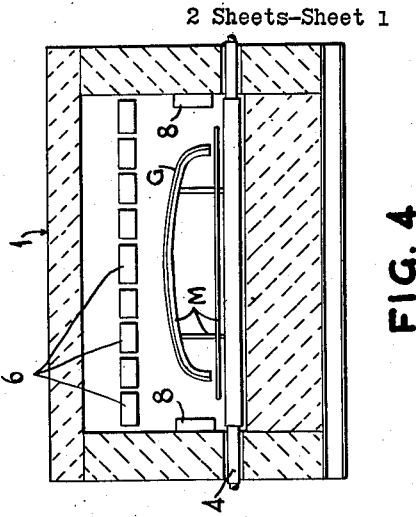
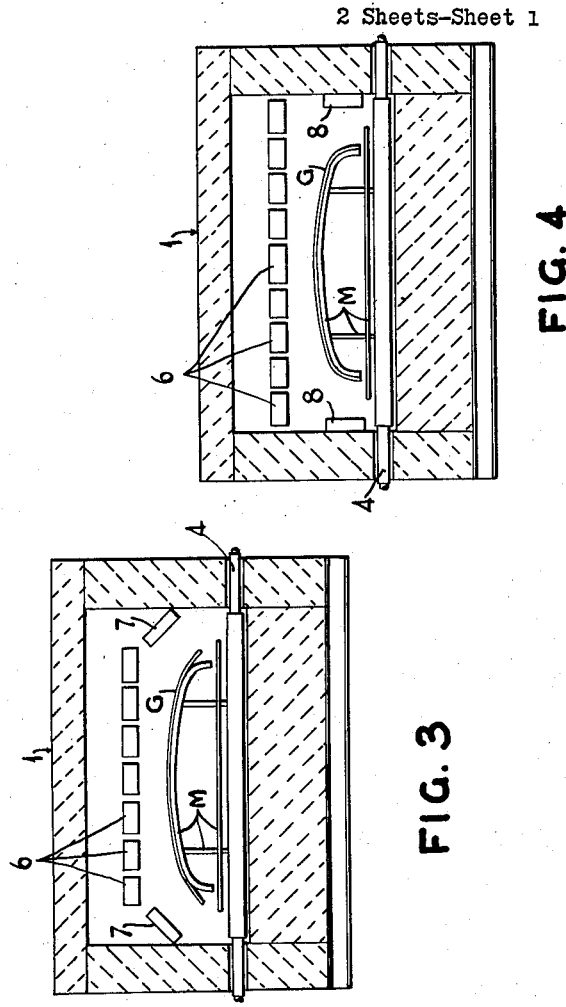
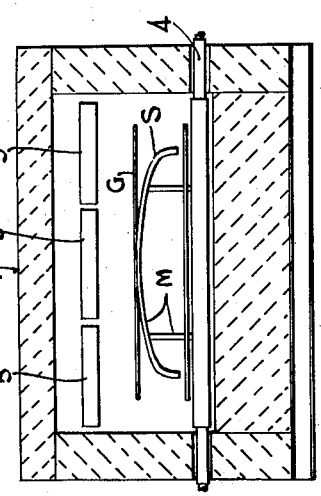
INVENTORS
RICHARD W. JONES
LLOYD V. BLACK
BY
Oscar L. Spencer
ATTORNEY Jan. 10, 1961  R. W. JONES ET AL  2,967,378
METHOD AND APPARATUS FOR BENDING GLASS
Filed Dec. 9, 1958  2 Sheets-Sheet 2

INVENTORS
RICHARD W. JONES and
LLOYD V. BLACK

Oscar L. Spencer
ATTORNEY

United States Patent Office 2,967,378
Patented Jan. 10, 1961

2,967,378

METHOD AND APPARATUS FOR BENDING GLASS

Richard W. Jones, O'Hara Township, Pa., and Lloyd V. Black, Murphy, N.C., assignors to Pittsburgh Plate Glass Company, Allegheny County, Pa., a corporation of Pennsylvania Filed Dec. 9, 1958, Ser. No. 779,218

15 Claims. (Cl. 49—7)

This invention pertains to method and apparatus for bending glass sheets upon curved shaping molds. More particularly, the invention is directed to the method of bending glass sheets by progressively heating the glass to different temperatures to cause the glass to bend progressively along decreasing radii without overheating or marring those portions of the glass already in contact with the mold.

Current designs of automobile windshields, known to the trade as wrap-arounds, have the ends of the glass bent to angles approaching 90° relative to the center portion of the glass and are difficult or impossible to produce on concave type molds. This is particularly true where, as in most cases, such windshields have pointed ends providing little or no support for positioning the glass above the concave mold during heating of the glass to bending temperatures.

Automobile windshields are made from laminated glass, hence it is necessary to bend both sheets of glass in one operation. Bending two sheets of glass at one time over concave molds, using prior art methods, results in damage to those portions of the glass already bent when raising the unbent portions to higher temperatures to complete the bending operation. Prior art methods were further found undesirable as they tend to cause the glass to bend unevenly, because the end portions of the glass contact the mold prior to engagement between intermediate portions of the plass and the mold. Such bending necessitated relative movement between the mold and the end portions causing undesirable optical distortions in the glass.

The primary object of the invention is to progressively and selectively raise the temperature of the glass upon the mold in such a manner as to control the flatness of the bending sheet, prevent thermal shock to the glass during heating and to restrict relative movement between the glass and the mold when in contact therewith to prevent marring of the glass surface.

Another object of the invention is to provide apparatus of simplified construction requiring a minimum of heating costs to raise the glass to the desired temperatures and prevent overheating the glass in areas where bending has been completed.

A further object of the invention is to bend glass in the manner described to a complex curve wherein the radius of curvature varies along an axis without the use of heat shields or external means contacting the glass during the bending operation.

According to the present invention, a glass sheet is subjected to a sequence of different heat patterns while supported on a mold having a curved shaped surface, which may be either convex or concave in elevation. The first heat pattern applies only general heat to heat the entire glass sheet with only sufficient intensity to bring the glass sheet to approximately its softening point so that the end portions of the glass sheet begin to deflect and its central portion conforms to the central portion of the shaping surface. Localized intense heat is then applied to a first portion immediately outboard of the portion that has conformed to the shaping surface and discontinued when the first portion has conformed to the shaping surface. Then, a second portion immediately outboard of the enlarged portion already contacting the shaping surface is heated intensely until it, too, contacts the shaping surface. The localized heating of the second portion is discontinued and local intense heat is sequentially applied and discontinued to successive outboard portions of the glass sheet until the entire glass sheet conforms to the shaping surface. The general heating is continued during the sequence of localized treatments.

In the drawings forming part of this specification:

Figure 1 is a longitudinal section through a heating furnace for practicing the invention;

Figure 2 is a cross-section through the heating furnace at the preheat zone indicated by the lines 2—2 of Figure 1;

Figure 3 is a cross-section through the heating furnace at a first bending zone indicated on Figure 1 by lines 3—3;

Figure 4 is a cross-section through the heating furnace at the second bending zone as indicated on Figure 1 by the lines 4—4;

Figure 5:
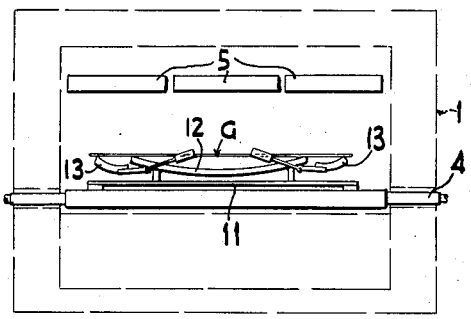
Figures 5, 6 and 7 are cross-sectionad views of an alternate embodiment of a heating furnace, similar to those of Figures 2, 3 and 4, respectively, illustrating furnace construction for bending glass sheets while mounted on sectionalized molds of concave contour rather than on molds of convex contour as in the earlier embodiment.

The remainder of the furnace of either embodiment comprises an annealing zone which may be of any well known design.

Referring now in detail to the drawings, the heating furnace comprises an elongated substantially rectangular structure 1 which is suitably insulated and reinforced to retain heat and resist warping. Suitable conveyors 2 and 3 lead up to and away from the furnace 1. Within the furnace, conveyor rolls 4 provide a support for the molds M moving through the furnace and are suitably powered to carry the molds through the furnace at a necessary speed to effect the desired heating of the mold and the glass supported thereon.

The mold M for practicing the invention may be of any suitable construction having a top surface S of the desired contour both longitudinally and transversely of the mold. Preferably the mold is of sufficiently light construction so as to heat evenly in the preheat zone and substantially as rapidly as the glass G supported thereon. A suitable mold embodying these construction details is disclosed in the copending application of Black and McRoberts. Such molds may be used to bend one or more sheets of glass at the same time. The glass is disposed upon the mold in such position that as it softens and bends it conforms to the contour of the mold so as to produce the desired shape.

When glass is bent upon a mold having its end portions more sharply curved than the intermediate portions, the more sharply bent portions of the glass must be heated to a higher temperature than the intermediate portions of the sheet if gravity alone is relied upon to cause the glass to conform to the shape of the mold. If the higher temperatures at the ends of the sheet were also applied to the central portions of the sheet in contact with the mold, this central portion would be marked by the mold or, as commonly referred to, would be burned. If the increased temperatures being applied to the ends of the sheet present too great a temperature differential, thermal shock occurs and usually causes the sheet to break or crack. The amount of heat produced and the manner of its application to the glass is therefore of prime importance to the practice of the present invention.

Referring now to the drawings, the conveyor rolls 2, 3 and 4 associated with the furnace 1 are suitably powered to move a mold and the glass thereon through the furnace at suitable rates to accomplish the desired heating and annealing operations. In the preheating zone of the furnace, to the left of Figure 1 of the drawings, heating elements 5 are disposed transversely of the furnace at suitable intervals above the mold. As the mold and glass thereon move through this zone, the elements 5 raise the temperature of the mold and glass only to approximately the glass softening point where the unsupported ends of the glass just begin to sag.

The mold then moves into the first bending zone where the heating elements 6 are arranged transversely of the furnace and the end elements 7 are inclined to the sides of the furnace to radiate heat substantially normally to the intermediate portions of the mold shaping surface. End elements 7 are disposed closer to the unbent end sections of the glass than elements 6. A plurality of heating elements 6 and 7 are disposed longitudinally of the furnace throughout this bending zone. The heat output of the heating elements 6 is substantially that of the heating elements 5 and the heat output of the heating elements 7 is greater so as to cause the glass to bend progressively outwardly from the center of the mold towards the end portions thereof as it moves through this zone. As the mold and glass thereon leave the first bending zone, the glass is bent substantially in the shape shown in Figure 3 of the drawings.

The mold and glass thereon then move into the second bending zone which is provided with a plurality of heating elements 6 disposed horizontally transversely of the furnace and heating elements 8 which are disposed substantially perpendicularly to the horizontally disposed heating elements. A plurality of groups of elements 6 and 8 are disposed longitudinally of this second heating zone. Heating elements 8 impart a higher output than the heating elements 7 and are disposed closer to the portions of the mold. This increased heating of the ends of the glass causes them to fold down against the mold so that as the mold and glass leave the second bending zone the glass is in position as shown in Figure 4 of the drawings.

The glass then enters the annealing zone where the temperature in the several sections of the glass is equalized. Then, the glass is cooled down through the annealing range in a suitable manner so as to relieve substantially all stresses within the glass set up during the bending operation before the mold emerges from the furnace.

The temperatures to which the several portions of the glass are heated during passage through the bending furnace 1 will be governed largely by the composition of the glass being bent. The angularity of the heating elements at the sides of the furnace, relative to the glass, is such that heat from these heating elements is directed substantially normal to the plane of the portion of the glass being bent in the particular bending zone. It is recognized that different shaped molds will cause the glass to bend progressively at different rates so that no one angular setting of the side heating elements would direct heat at the same angle against glass being bent on different molds. It is preferable therefore to set these side heating elements at such an angle that the previously bent portions of the glass receive a minimum of additional heat from the angularly disposed heating elements and the major portion of the heat flows into the unbent portions of the glass.

In its optimum embodiment, the present invention provides for bending glass sheets initially suppported on the uppermost portion of a convex shaping surface of a convex mold by heating the entire glass sheet with sufficient intensity to bring the glass sheet only to approximately its softening point, thereby beginning to deflect the end portions of the glass toward the shaping surface, and applying additional localized intense heat to a first portion of the partially bent glass sheet immediately outboard of the portion that has conformed to the shaping surface, discontinuing the application of the localized intense heat when the first portion has conformed to the shaping surface, and applying and discontinuing localized intense heat in a step-wise manner to successive outboard portions of the glass sheet until the entire glass sheet conforms to the shaping surface, the step-wise intense localized heat being applied while continuing the general uniform heating.

In the beginning of this novel bending cycle, the mass of the unsupported ends of the flat glass sheet provides mechanical force that helps conform the central portion of the heated glass sheet to the central portion of the shaping surface of the convex bending mold. As the additional heat is applied to successive localized portions for a period sufficient to conform each successive portion to successive portions of the shaping surface and then discontinued, the mass of unsupported glass helping to assist the sagging of the glass into conformity with the convex mold shaping surface decreases.

The portions of the partly bent glass sheet already conformed to the shaping surface are maintained at their elevated temperatures to avoid steep thermal gradients which result in fracture induced by thermal shock. At the same time, transverse sagging the the conformed portions is prevented by virtue of the fact that some mechanical force such as that provided by the unsupported end portions of the glass sheet is necessary to sag the glass at its temperature resulting from maintaining the general heating pattern.

By applying more intense localized radiation in a direction substantially normal to each localized portion bent and by locating each successive additional heating element closer to each successive portion of the glass sheet to be bent, each increment of glass is conformed in sequence to a different increment of the convex shaping surface of the bending mold. The increased intensity of additional heat applied to each successive increment of the glass sheet conformed to the mold compensates for the decrease in mechanical force assisting the glass to conform to the convex mold. Furthermore, the sequential conformance of localized, successively outboard portions of the glass sheet to the convex mold shaping surface minimizes the tendency of the glass sheet to separate from localized portions of a shaping surface of non-uniform curvature and improves the likelihood of the glass sheet bending into intimate conformity to the mold shaping surface.

The present invention is also susceptible of accomplishment while bending glass sheets on molds of concave contour as well as convex contour. Furthermore, the glass sheet bending mold employed for such bending may be either sectionalized or unitary.

Figure 6:
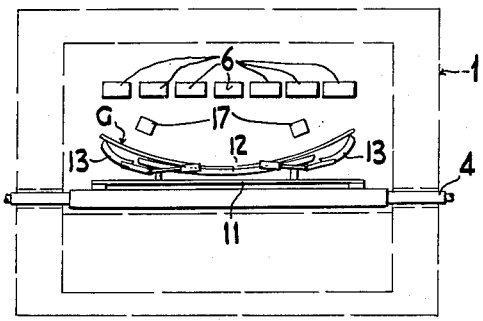
Figure 7:
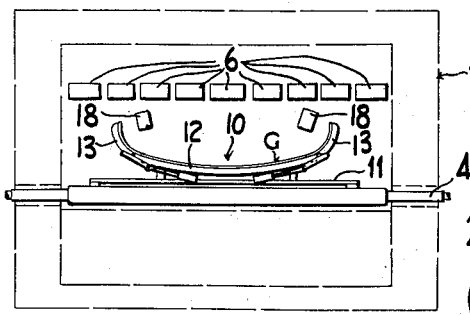

Figures 5, 6 and 7 show how the sequence of heating patterns may be employed to bend glass sheets on sectionalized molds of concave elevation.

A typical sectionalized mold of concave elevation, represented generally by reference numeral 10, is mounted on a mold support carriage 11 for conveyance through the bending furnace 1. Mold 11 comprises a center molding member 12 and counterweighted wing members 13 flanking the center molding member 12 and pivotable between a spread position for supporting a flat glass sheet for bending, as in Figure 5, and a closed mold position to provide a substantially continuous shaping surface to which the glass sheet conforms after bending, as in Figure 7.

Mold 10 is so constructed that in the spread position it provides support points for the flat glass at the longitudinal extremities of the center molding member and the longitudinal outboard extremities. While the counterweights urge the wing members 13 to pivot into the closed mold position, the mold is so constructed that the mass of the rigid sheet supported thereby inhibits the tendency of the wing sections to pivot until the glass sheet softens.

In Figure 5 as in Figure 2 of the previous embodiment, heating elements 5 are disposed transversely of the furnace at suitable intervals above the conveyor 4 to irradiate heat sufficiently to raise the temperature of the glass supported on the spread mold to its softening point. The glass sheet, being supported at points spaced from its central region rather than centrally as with convex molds, deflects toward the mold shaping surface as it softens upon exposure to elevated temperatures.

In the first bending zone, the central portion of the glass sheet sags to conform to the central portion of the center molding member 12 and the wing members 13 begin to pivot to raise the flanking portions of the glass sheet off the intermediate support points provided by the longitudinal extremities of the center molding member. In this zone, additional localized heaters 17 are placed below the general heaters 6 outboard of the central portion of the furnace where the glass has conformed to the central portion of the mold shaping surface. The heating elements 17 are oriented to direct localized heat substantially normally toward the glass sheet regions that have been lifted off the intermediate support points or obliquely to the orientation of the overhead heaters 6. This localized additional heat causes the incremental portions locally irradiated to conform to the mold shaping surface.

The glass laden mold then passes through successive bending zones employing overhead heaters 6 which provide a general ambient atmosphere at a temperature sufficient to prevent the glass from being cooled below its annealing range. These successive bending zones include additional localized heating elements successively oriented at greater angles to the horizontal to irradiate successively outboard portions of the glass sheet.

The final bending zone is disclosed in Figure 7, wherein heating elements 6 are disposed horizontally transversely of the furnace as in Figure 6 and heating elements 18 are disposed perpendicularly to the horizontally disposed heating elements in order to irradiate the last portions of the glass sheets that conform to the upper shaping of the pivotable wing members 13 of the sectionalized concave mold 10. In this embodiment, since mechanical force assists the glass to conform to the mold shaping surface, it is possible to shape the glass sheets into wraparound bends even though concave molds are employed.

It is to be noticed that both embodiments have features in common. In both embodiments, the general heating pattern is maintained throughout the bending cycle. In both embodiments, localized heat is applied to successive increments of the glass and discontinued when the increment conforms to the mold shaping surface, each successive increment being longitudinally outboard of the previously locally heated increment.

While the particular thermal pattern of a bending furnace has been described in connection with bending glass sheets to wrap-around bends on unitary convex molds and on concave molds that are sectionalized and counterweighted, it is understood that these embodiments are illustrative only and the principles of the present invention may be employed with other apparatus such as sectionalized convex molds and non-sectionalized concave molds or molds that are sectionalized in a different manner from the specific constructions illustrated.

This application is a continuation-in-part of application Serial No. 407,360, filed February 1, 1954, now abandoned entitled, Method and Apparatus for Bending Glass.

What is claimed is:
1. Apparatus for bending flat glass sheets comprising a curved mold adapted for supporting a flat glass sheet thereon for bending, a heating furnace divided successively into a preheat zone, bending zones and an annealing zone and comprising a conveyor for transporting the curved molds through the heating furnace, heating means in the preheat zone for heating the mold and glass thereon and comprising heating elements constructed and arranged to radiate heat normally to the flat sheet mounted on the mold, heating means in the first bending zone intermediate the longitudinal center line and the walls of the furnace and angularly disposed with respect to the heating means in the preheat zone to radiate heat substantially normally to portions of the mold flanking its central portion, heating means in successive bending zones located on either side of the longitudinal center line and angularly disposed at successively greater angles with respect to the orientation of the heating means in the preheat zone to radiate heat substantially normally to successively outboard portions of the mold, and means in the annealing zone for cooling and annealing the glass on the mold.

2. Apparatus for bending flat glass plates comprising a convex mold including an elevated central portion for supporting the central portion of a flat glass sheet thereon, a heating furnace divided successively into a preheat zone, at least two bending zones including a first bending zone and a second bending zone, and an annealing zone; heating means in the preheat zone for heating the mold and glass thereon to substantially the glass softening point whereby the unsupported ends of the glass sheet help conform the central portion of the glass sheet to the central portion of the convex mold; means in said first bending zone adjacent the sides thereof for applying additional heat to the unbent glass intermediate the center and both ends of the plate; means in said second bending zone for increasing the temperature of the glass at only the ends of the plate; means in the annealing zone for progressively cooling and annealing the glass upon the mold; and conveyor means for moving the mold and glass thereon through the heating furnace.

3. Apparatus for bending flat glass sheets comprising a convex mold adapted for supporting a flat glass sheet thereon for bending, a heating furnace divided successively into a preheat zone, bending zones and an annealing zone and comprising a conveyor for transporting the convex molds through the heating furnace, heating means in the preheat zone for heating the mold and glass thereon and comprising heating elements constructed and arranged to radiate heat normally to the flat sheet mounted on the mold, heating means in the first bending zone intermediate the longitudinal center line and the walls of the furnace and angularly disposed with respect to the heating means in the preheat zone to radiate heat substantially normally to portions of the mold flanking its central portion, heating means in successive bending zones located at successively greater distances from and on either side of the longitudinal center line and angularly disposed at successively greater angles with respect to the orientation of the heating means in the preheat zone to radiate heat substantially normally to successively outboard portions of the mold, and means in the annealing zone for cooling and annealing the glass on the mold.

4. In apparatus according to claim 3, wherein said angularly disposed heating means in each successive bending zone is constructed to impart more heat toward the glass sheet than that imparted by said angularly disposed heating means in the preceding bending zones.

5. Apparatus for bending flat glass sheets to conform to the upper shaping surface of convex molds and comprising a convex mold, a conveyor for transporting the mold longitudinally of the furnace, a first set of electrical heaters extending along a first transverse axis in a horizontal plane oriented to direct radiant energy vertically downwardly toward the glass loaded mold, a second set of heaters located along a second transverse axis, spaced on either side of the longitudinal center line of the furnace and oriented to direct radiant energy downwardly and obliquely along axes substantially normal to intermediate portions of the mold intermediate its center and its ends, a third set of electrical heaters located along a third transverse axis, spaced on either side of the longitudinal center line of the furnace a greater distance therefrom than the heaters in the second set, said third set of heaters oriented at a greater angle relative to the first set of heaters than the second set to radiate heat along axes substantially normal to portions of the mold outboard of said intermediate portions, said first, second and third sets of heaters being disposed in succession along said conveyor.

6. Apparatus for bending flat glass sheets to conform to the upper shaping surface of convex bending molds and comprising a convex mold, a conveyor for transporting the glass laden convex mold longitudinally of the furnace, a first set of heaters extending along a first transverse axis in a horizontal plane separated a comparatively large distance from the passing mold, a second set of heaters located along a second transverse axis, spaced horizontally on either side of the longitudinal center line of the furnace and separated a lesser distance from the passing mold, and a third set of heaters located along a third transverse axis, spaced horizontally on either side of the longitudinal center line of the furnace a distance greater than the corresponding heater of the second set and separated a still lesser distance from the passing mold, said first, second and third sets of heaters being disposed in succession along said conveyor, wherein the heaters of each successive set are oriented at a greater angle relative to a horizontal plane to impart radiant heat substantially normally to different portions of the passing glass sheet supported on the convex mold for bending.

7. In the method of bending glass sheets wherein a flat glass sheet is initially supported by supporting a portion thereof upon the highest portion of a curved shaping surface and then heated to bending temperature, the steps of heating the entire glass sheet with only sufficient intensity to bring the glass sheet to approximately its softening point so that an end portion of the glass begins to deflect toward the shaping surface and its central portion conforms to the central portion of the shaping surface, applying localized intense heat to a first portion immediately outboard of the portion that has conformed to the shaping surface, discontinuing the application of localized intense heat when the first portion has conformed to the shaping surface, applying localized intense heat to a second portion immediately outboard of the first portion until the second portion conforms to the shaping surface, discontinuing the application of localized intense heat to the second portion, and sequentially applying and discontinuing the application of local intense heating to successive outboard portions of the glass sheet until the entire glass sheet conforms to the shaping surface, the intense localized heat being applied while continuing the general heating.

8. In the method according to claim 7, wherein each application of local intense heat is applied in a direction substantially normal to each localized portion being conformed to the shaping surface.

9. The method according to claim 7, wherein the glass is conveyed during the heating process, so that the glass sheet is located in different positions when different portions are subjected to localized intense heating.

10. The method according to claim 7, wherein the step-wise application of localized intense heat is performed on both sides of the mid-portion of the sheet.

11. In the method of bending glass sheets wherein a flat glass sheet is initially supported by supporting a portion thereof upon the highest portion of a convex shaping surface and then heated to bending temperature, the steps of heating the entire glass sheet with only sufficient intensity to bring the glass sheet to approximately its softening point so that an end portion of the glass begins to deflect toward the shaping surface and its initially supported portion conforms to the highest portion of the shaping surface, applying localized intense heat to a first portion immediately outboard of the portion that has conformed to the shaping surface, discontinuing the application of localized intense heat when the first portion has conformed to the shaping surface, applying localized intense heat to a second portion immediately outboard of the first portion until the second portion conforms to the shaping surface, discontinuing the application of localized intense heat to the second portion, and sequentially applying and discontinuing the application of local intense heating to successive outboard portions of the glass sheet until the entire glass sheet conforms to the shaping surface, the intense localized heat being applied while continuing the general uniform heating.

12. In the method according to claim 11, wherein each application of local intense heat is applied in a direction substantially normal to each localized portion being conformed to the shaping surface.

13. The method according to claim 11, wherein each application of intense localized heating is more intense than the previous application.

14. The method according to claim 11, wherein the glass is conveyed during the heating process, so that the glass sheet is located in different positions when different portions are subjected to localized intense heating.

15. The method according to claim 11, wherein the step-wise application of localized intense heat is performed on both sides of the mid-portion of the sheet.

References Cited in the file of this patent

UNITED STATES PATENTS

| | | |
|---|---|---|
| 2,111,392 | Galey | Mar. 15, 1938 |
| 2,176,999 | Miller | Oct. 24, 1939 |
| 2,348,905 | Hopfield | May 16, 1944 |
| 2,450,297 | Pearse et al. | Sept. 28, 1948 |
| 2,646,647 | Bamford et al. | July 28, 1953 |
| 2,671,987 | Jendrisak | Mar. 16, 1954 |
| 2,671,988 | Walters | Mar. 16, 1954 |

UNITED STATES PATENT OFFICE
CERTIFICATE OF CORRECTION

Patent No. 2,967,378 January 10, 1961

Richard W. Jones et al.

It is hereby certified that error appears in the above numbered patent requiring correction and that the said Letters Patent should read as corrected below.

Column 1, line 42, for "plass" read -- glass --; line 65, for "shaped" read -- shaping --; column 2, line 25, for "cross-sectionad" read -- cross-sectional --; column 3, lines 40 and 41, for "the portions" read -- the end portions --; column 4, line 28, for "sagging the the" read -- sagging of the --.

Signed and sealed this 14th day of November 1961.

(SEAL)
Attest:

ERNEST W. SWIDER
Attesting Officer

DAVID L. LADD
Commissioner of Patents